United States Patent [19]

Luthman et al.

[11] 3,713,661
[45] Jan. 30, 1973

[54] MUD GUARD FOR TANDEM AXLE ASSEMBLY

[75] Inventors: Paul A. Luthman, Maria Stein; Thomas R. Fischer, Wapakoneta, both of Ohio

[73] Assignee: Avco Corporation, Coldwater, Ohio

[22] Filed: May 28, 1971

[21] Appl. No.: 147,760

[52] U.S. Cl. .............................. 280/104.5 R, 305/12
[51] Int. Cl. .............................................. B60g 5/02
[58] Field of Search ........ 280/104.5, 152, 153, 154.5, 280/158; 305/12

[56] References Cited

UNITED STATES PATENTS

| 2,560,307 | 7/1951 | Slemmons | 305/12 |
| 2,531,111 | 11/1950 | Daniels | 305/12 X |
| 2,077,919 | 4/1937 | Engstrom | 301/41 R X |

Primary Examiner—Philip Goodman
Attorney—Charles M. Hogan and Gary M. Gron

[57] ABSTRACT

The disclosure illustrates a mud guard skirt for a tandem axle assembly of a manure spreader. The skirt is positioned in such a manner that it removes foreign material from both the forward and aft wheels and in addition protects the axle assembly when manure is being loaded into the spreader from its side.

7 Claims, 3 Drawing Figures

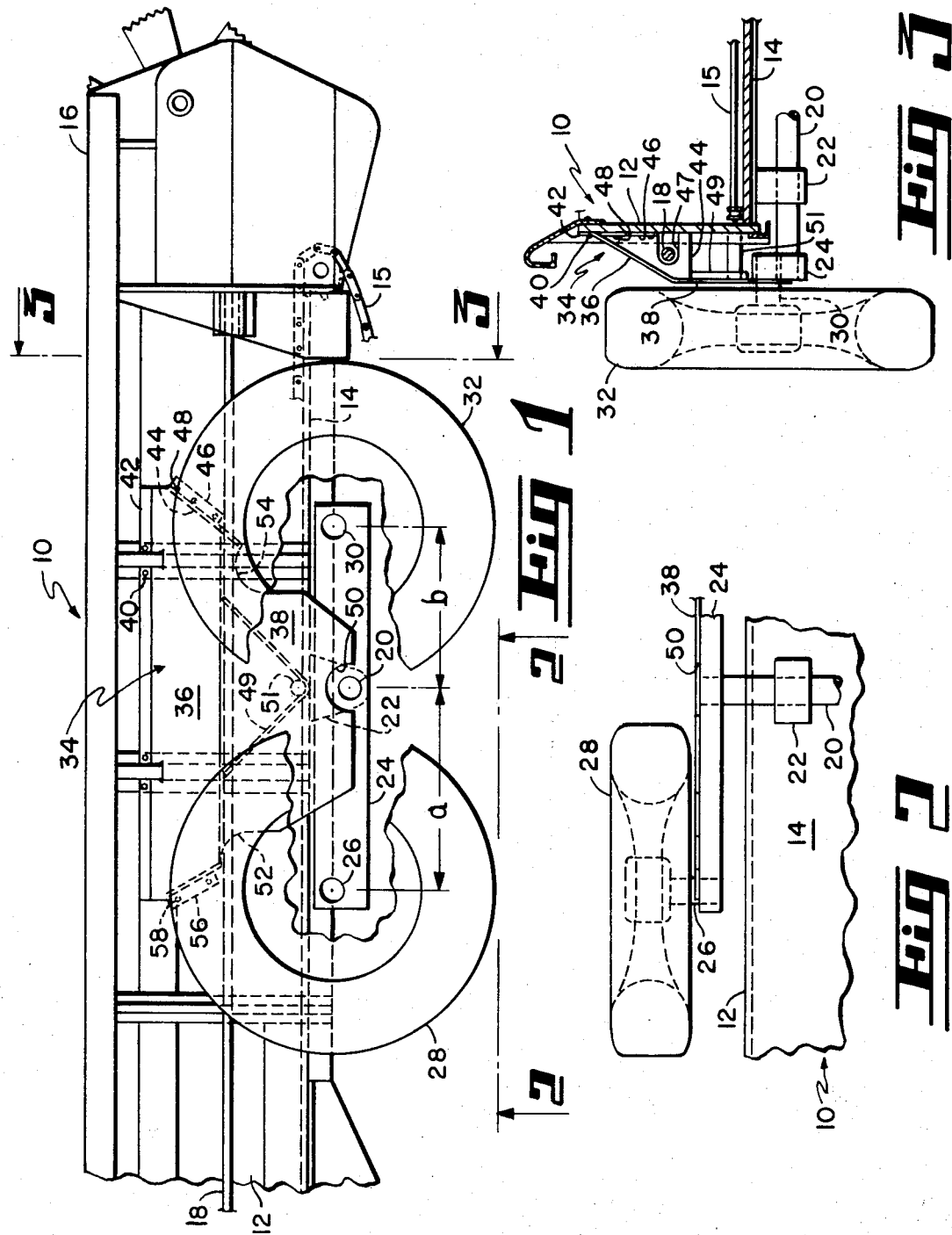

MUD GUARD FOR TANDEM AXLE ASSEMBLY

The present invention relates to tandem axle assemblies and more particularly to a foreign material guard for assemblies of this type.

The tandem axle assembly has long been used to support relatively heavy vehicles for ground movement. Recently developed manure spreaders with greatly increased capacities necessitate a dual wheel tandem axle assembly. This is necessary to distribute the weight of the spreader and minimize the tendency for the spreader to sink in the field over which the spreader is pulled. Even with the dual wheel tandem axle assembly the wheels tend to dig in somewhat, thus causing a substantial build-up of mud and other foreign material such as corn stalks, etc. on the sides of the wheels. This foreign material tends to accumulate in the space between the wheel and the spreader body. When the spreader is parked outside for the night very often the material becomes frozen and binds the axle assembly to such as extent that it may bend or break the parts when the spreader is re-used.

Another problem arises because manure spreaders are loaded with manure from the sides. During loading there is a tendency for some of the manure to drop down on the axle assembly. This manure may freeze also and prevent proper operation of the spreader.

Therefore it is an object of the present invention to economically and effectively present the accumulation of foreign material on a tandem axle assembly.

The above ends are achieved by a means extending radially along the side of wheel assemblies of a tandem axle unit adjacent their peripheries for removing foreign material accumulated on their inner facing sides during ground movement.

The above and other related objects and features of the present invention will be apparent from a reading of the description of the disclosure shown in the accompanying drawing and the novelty thereof pointed out in the appended claims.

In the drawing:

FIG. 1 is a fragmentary side view of a manure spreader and tandem axle assembly with which the present invention may be used;

FIG. 2 is a view taken on line 2—2 of FIG. 1; and

FIG. 3 is a view taken on line 3—3 of FIG. 1.

Referring now to FIG. 1 there is shown a manure spreader comprising a generally rectangular body 10 having side walls 12 (only one of which is shown) connected by a bottom wall 14. The walls 12 and 14 form a boxlike structure in which manure is placed for transfer to a spreading mechanism 16 by a conveyor 15. The conveyor is driven by the spreading mechanism 16 which receives its input from a suitable source. The rate of operation of the conveyor 15 is controlled from an operator station via a rod 18 extending longitudinally along the wall 12 to the spreading mechanism 16. The details of the conveyor 15 and the spreading mechanism 16 are not discussed to simplify and assist in the understanding of the present invention. For a detailed description of such a mechanism particularly suitable for this type of spreader see U.S. Pat. No. 3,430,818 in the name of Lawrence J. Vagedes et al., entitled "Feed Controls for Material Unloaders", of common assignment with the present invention.

The manure spreader 10 is supported for ground movement by a tandem axle assembly which comprises stub axles 20 extending laterally from both sides of the spreader body 10 and pivotally mounted to it by suitable bearing assemblies 22. A spreader tie bar 24 is secured to the stub axle 20 and extends in a forward and aft direction relative to the manure spreader 10. The forward end of the tie bar 24 has a spindle 26 on which a forward wheel assembly 28 is journaled. The aft end of the tie bar has a spindle 30 on which an aft wheel assembly 32 is journaled.

It is noted that the distance A between spindle 26 and the stub axle 20 is greater than the distance B between the spindle 30 and stub axle 20. This is done to place more of the vehicle weight on the aft wheel assembly 32 than on the forward wheel assembly 28. This permits the forward wheel assembly 28 to ride up over obstacles and muddy terrain to reduce the force necessary to pull the spreader. In addition, the stub axle 20 is offset below a line which extends between spindles 26 and 30 to lower the center of gravity of the spreader and stabilize it.

A skirt 34 having an upper downwardly inclined panel 36 and a lower generally vertical panel 38 is secured to the side wall 12 by screws 40 extending through a flange 42. A laterally extending aft flange 44 extends inward from the aft end of skirt 34 and is secured to the side wall 12 by screw 48 extending through a flange 46. The forward end of skirt 34 is secured to side wall 12 by screws 58 extending through a flange 56. An opening 47 is provided in flange 46 to clear the control rod 18.

The panel 38 of skirt 34 extends down over the outer facing side of tie bar 24 and is held against it for relative sliding movement by rod 51 and V-shaped braces 49. A recess 50 in panel 38 receives the outer portion of stub axle 20.

The skirt 34 has forward and aft recesses 52 and 54, respectively, which are in line with the arcs that spindles 26 and 30 make when the tie bar 24 is pivoted. These recesses are shaped to accommodate the maximum anticipated pivoting of tie bar 24.

During movement of the manure spreader 10 along the ground and particularly under field conditions, there is a tendency for mud and other foreign material to be collected on the wheel assemblies 28 and 32. The foreign material tends to be flung from the ground contact area of the wheels and from their outer sides by centrifugal force. However, the foreign material tends to stay on the inner sides of the wheel near their periphery. The flange 44 of skirt 34 removes material from the inner side of the aft wheel assembly 32 near its periphery, as shown in FIG. 3, and the panels 38 and 36 deflect the material from the axle assembly. The material on forward wheel assembly 28 is removed by the bottom portion of tie bar 24 and deflected from the axle assemblies by the panels 38 and 36 of the skirt 34. As particularly evident in FIG. 1, both the tie bar 24 and the flange 44 are positioned so that material removed by them falls to the ground by gravity. The panel 38 of skirt 34 is positioned to define at least a constant clearance relative to the wheel assemblies 32 and 28 and preferably an increasing clearance, as shown particularly in FIG. 3. This prevents the wedging of foreign material between the panel 38 and the side walls of the wheels which could cause increased friction.

The triangular support 49 and the bar 51 maintain the panel 38 against tie bar 24 while still permitting pivoting displacement of the tie bar 24. The downwardly inclined panel 36 prevents any material from falling down onto the axle assembly and to the control bar 18. This particularly prevents a dropping of material on these assemblies when the manure spreader is being loaded from the side directly over the wheel assembly.

The unequal lengths of the spindles from the pivot of the stub axle enable the spreader to traverse a muddy field without bogging down. In addition, the foreign material removal by the tie bar 24, flange 44 and skirt 34 prevents build-up of foreign material on the inside of the wheels. This in turn insures that there is no material on the tandem axle assembly that can freeze overnight and prevent proper operation the next working day.

While the preferred embodiment of the present invention has been described, it is apparent to those skilled in the art that modifications may be made without departing from the spirit and scope of the present invention.

Having described the invention what is claimed as novel and desired to be secured by Letters Patent of the United States is:

1. A vehicle comprising:
    a body;
    a tandem axle assembly extending laterally from both sides of said body;
    forward and aft wheel assemblies journaled on said tandem axle on both sides of said body supporting said vehicle for ground movement;
    means extending radially along the side of each wheel assembly adjacent its periphery and in between the wheel assemblies and the body for removing foreign material accumulated on the sides of said wheel assemblies during ground movement; and
    a skirt positioned over each of the tandem axle assemblies, said skirt extending from said foreign material removing means and having at least a constant clearance relative to the side of the wheel assemblies, thereby preventing the wedging of foreign material between the skirt and the side of the wheel assemblies.

2. A vehicle as in claim 1 wherein said foreign material removing means is positioned so that the material so removed drops away from the wheel assemblies by gravity.

3. A vehicle as in claim 1 wherein said skirt comprises an upper panel inclined downwardly away from the sides of said body and a lower panel extending downward generally vertically whereby the lower panel maintains at least said constant clearance between the skirt and the sides of the wheel.

4. A vehicle as in claim 1 wherein:
    said tandem axle assembly comprises: a stub axle extending laterally from both sides of said body and pivotally mounted with respect thereto; a tie bar mounted to said stub axle; and fore and aft wheel spindles for journaling said fore and aft wheel assemblies to said tie bar;
    said skirt extends over and abuts the outer side of said tie bar; and
    said skirt has recesses therein for accommodating the maximum anticipated displacement of said fore and aft wheel assemblies during pivoting of said tie bar.

5. A vehicle as in claim 4 wherein:
    said aft foreign material removing means comprises a flange extending radially inward from the aft edge of said skirt in such a direction that material removed thereby falls to the ground by gravity;
    the bottom portion of said skirt abuts said tie bar to form the foreign material removing means for said forward wheel assembly, said tie bar being positioned so that material removed thereby falls to the ground.

6. A vehicle as in claim 1 wherein said tandem axle assembly comprises:
    stub axles extending laterally from both sides of the body and pivotally mounted with respect thereto;
    tie bars extending forward and aft and mounted to said stub axles for pivotal movement relative to said body; and
    wheel spindles mounted adjacent the forward and aft ends of said tie bars for journaling said wheel assemblies to said tie bar, the forward wheel spindle being positioned a greater distance from the pivot point of the stub axle than the aft wheel spindle whereby the decreased weight applied to the forward wheel assembly permits the wheel assemblies to ride over ground obstructions.

7. A vehicle as in claim 6 wherein the pivot point of the stub axle is offset downward from a line drawn between the forward and aft wheel spindles.

* * * * *